US007158628B2

(12) United States Patent
McConnell et al.

(10) Patent No.: US 7,158,628 B2
(45) Date of Patent: Jan. 2, 2007

(54) METHOD AND SYSTEM FOR SELECTING A PREFERRED CONTACT CENTER AGENT BASED ON AGENT PROFICIENCY AND PERFORMANCE AND CONTACT CENTER STATE

(75) Inventors: Matthew G. A. McConnell, Alpharetta, GA (US); John C. C. McIlwaine, Alpharetta, GA (US); Rick Baggenstoss, Decatur, GA (US); Scott Richter, Gainesville, GA (US); Robert L. Beard, Alpharetta, GA (US); Eric Blumthal, Atlanta, GA (US); Jennifer C. East, Alpharetta, GA (US); Lisa Marie Foley, Atlanta, GA (US)

(73) Assignee: Knowlagent, Inc., Alpharetta, GA (US)

( * ) Notice: Subject to any disclaimer, the term of this patent is extended or adjusted under 35 U.S.C. 154(b) by 242 days.

(21) Appl. No.: 10/645,917

(22) Filed: Aug. 20, 2003

(65) Prior Publication Data

US 2005/0043986 A1    Feb. 24, 2005

(51) Int. Cl.
*H04M 3/00* (2006.01)
(52) U.S. Cl. .................... 379/265.02; 379/265.03; 379/265.06; 379/265.12
(58) Field of Classification Search ............ 379/265.02, 379/265.03, 265.06, 265.09, 265.12
See application file for complete search history.

(56) References Cited

U.S. PATENT DOCUMENTS

| 3,245,157 A | 4/1966 | Laviana ..................... 35/9 |
| 3,594,919 A | 7/1971 | De Bell et al. |
| 3,705,271 A | 12/1972 | De Bell et al. |
| 4,447,421 A | 5/1984 | Klothen |
| 4,505,936 A | 3/1985 | Meyers et al. |
| 4,684,349 A | 8/1987 | Ferguson et al. |
| 4,776,016 A | 10/1988 | Hansen |

(Continued)

FOREIGN PATENT DOCUMENTS

WO    WO 98/22864    5/1998

(Continued)

OTHER PUBLICATIONS

*ACTV NET Debuts eSchool Online*; Business Wire; Mar. 24, 1997, pp. 03241287.

(Continued)

*Primary Examiner*—Bing Q. Bui
(74) *Attorney, Agent, or Firm*—King & Spalding LLP

(57) ABSTRACT

A method and system for selecting an agent to service a contact at a contact center accounts for the state of the contact center and for individual agent proficiency and performance. A software-implemented method includes an algorithm that adjusts the agent-selection process according to variations in state such as fluctuating call volume. When two or more metrics describe distinct aspects of an agent's performance and both aspects are relevant to agent selection, the algorithm can weigh each according to relative importance to the center's operational effectiveness. The present invention couples to the information infrastructure of a computer-based contact center and interfaces with the components of the center that acquire and maintain information pertinent to the agent-selection process. This connectivity delivers real-time information to the software algorithms and thereby facilitates rapid response to changing conditions.

13 Claims, 10 Drawing Sheets

U.S. PATENT DOCUMENTS

| | | | |
|---|---|---|---|
| 4,853,952 A | 8/1989 | Jachmann et al. | |
| 4,916,726 A | 4/1990 | Morley et al. | |
| 5,058,008 A | 10/1991 | Schumacher | |
| 5,100,329 A | 3/1992 | Deesen et al. | |
| 5,110,329 A | 5/1992 | Pieper | |
| 5,199,062 A | 3/1993 | Von Meister et al. | |
| 5,206,903 A | 4/1993 | Kohler et al. | 379/309 |
| 5,228,859 A | 7/1993 | Rowe | 434/118 |
| 5,239,460 A * | 8/1993 | LaRoche | 705/11 |
| 5,299,260 A * | 3/1994 | Shaio | 379/266.07 |
| 5,309,505 A | 5/1994 | Szlam et al. | |
| 5,310,349 A | 5/1994 | Daniels et al. | |
| 5,311,422 A | 5/1994 | Loftin et al. | |
| 5,384,841 A | 1/1995 | Adams et al. | |
| 5,416,694 A | 5/1995 | Parrish et al. | |
| 5,469,491 A | 11/1995 | Morley, Jr. et al. | |
| 5,499,291 A | 3/1996 | Kepley | 379/265 |
| 5,511,112 A | 4/1996 | Szlam | |
| 5,513,308 A | 4/1996 | Mori | 395/155 |
| 5,533,115 A | 7/1996 | Hollenbach et al. | |
| 5,535,256 A | 7/1996 | Maloney et al. | |
| 5,583,965 A | 12/1996 | Douma et al. | |
| 5,590,188 A | 12/1996 | Crockett | |
| 5,594,791 A | 1/1997 | Szlam et al. | |
| 5,597,312 A | 1/1997 | Bloom et al. | |
| 5,633,924 A | 5/1997 | Kaish et al. | |
| 5,659,768 A | 8/1997 | Forbes et al. | |
| 5,675,637 A | 10/1997 | Szlam et al. | |
| 5,696,811 A | 12/1997 | Maloney et al. | |
| 5,703,943 A | 12/1997 | Otto | |
| 5,721,770 A | 2/1998 | Kohler | |
| 5,727,950 A | 3/1998 | Cook et al. | |
| 5,738,527 A | 4/1998 | Lundberg | |
| 5,745,109 A | 4/1998 | Nakano et al. | |
| 5,757,644 A | 5/1998 | Jorgensen et al. | |
| 5,790,798 A | 8/1998 | Beckett, II et al. | |
| 5,818,907 A | 10/1998 | Maloney et al. | |
| 5,825,869 A | 10/1998 | Brooks et al. | |
| 5,827,071 A | 10/1998 | Sorensen et al. | |
| 5,833,468 A | 11/1998 | Guy et al. | |
| 5,861,881 A | 1/1999 | Freeman et al. | |
| 5,877,954 A | 3/1999 | Klimasauskas et al. | |
| 5,903,641 A | 5/1999 | Tonisson | |
| 5,904,485 A | 5/1999 | Siefert | |
| 5,911,134 A | 6/1999 | Castonguay et al. | |
| 5,914,951 A | 6/1999 | Bentley et al. | |
| 5,915,973 A | 6/1999 | Hoehn-Saric et al. | |
| 5,937,037 A | 8/1999 | Kamel et al. | |
| 5,943,416 A | 8/1999 | Gisby | |
| 5,946,375 A | 8/1999 | Pattison et al. | |
| 5,946,387 A | 8/1999 | Miloslavsky | |
| 5,947,747 A | 9/1999 | Walker et al. | |
| 5,957,659 A | 9/1999 | Amou et al. | |
| 5,963,635 A | 10/1999 | Szlam et al. | |
| 5,971,271 A | 10/1999 | Wynn et al. | |
| 5,991,394 A | 11/1999 | Dezonno et al. | |
| 6,014,134 A | 1/2000 | Bell et al. | |
| 6,038,544 A | 3/2000 | Machin et al. | |
| 6,039,575 A | 3/2000 | L'Allier et al. | |
| 6,044,355 A | 3/2000 | Crockett et al. | |
| 6,044,368 A | 3/2000 | Powers | |
| 6,052,460 A | 4/2000 | Fisher et al. | |
| 6,058,163 A | 5/2000 | Pattison et al. | |
| 6,067,537 A | 5/2000 | O'Connor et al. | |
| 6,067,538 A | 5/2000 | Zorba et al. | |
| 6,070,142 A | 5/2000 | McDonough et al. | |
| 6,073,127 A | 6/2000 | Lannert et al. | |
| 6,078,894 A | 6/2000 | Clawson et al. | |
| 6,086,381 A | 7/2000 | Downs et al. | |
| 6,108,687 A | 8/2000 | Craig | |
| 6,118,865 A | 9/2000 | Gisby | |
| 6,118,973 A | 9/2000 | Ho et al. | |
| 6,119,097 A | 9/2000 | Ibarra | |
| 6,128,380 A | 10/2000 | Shaffer et al. | |
| 6,134,539 A | 10/2000 | O'Connor et al. | |
| 6,141,528 A | 10/2000 | Remschel | |
| 6,144,971 A | 11/2000 | Sunderman et al. | |
| 6,146,148 A | 11/2000 | Stuppy | |
| 6,149,441 A | 11/2000 | Pellegrino et al. | |
| 6,155,840 A | 12/2000 | Sallette | |
| 6,163,607 A | 12/2000 | Bogart et al. | |
| 6,170,014 B1 | 1/2001 | Darago et al. | |
| 6,171,109 B1 | 1/2001 | Ohsuga | |
| 6,192,122 B1 | 2/2001 | Flockhart et al. | |
| 6,201,948 B1 | 3/2001 | Cook et al. | |
| 6,211,451 B1 | 4/2001 | Tohgi et al. | |
| 6,215,865 B1 | 4/2001 | McCalmont | |
| 6,263,049 B1 | 7/2001 | Kuhn | |
| 6,275,812 B1 | 8/2001 | Haq et al. | |
| 6,278,777 B1 * | 8/2001 | Morley et al. | 379/265.02 |
| 6,278,978 B1 | 8/2001 | Andre et al. | |
| 6,289,340 B1 | 9/2001 | Puram et al. | |
| 6,301,573 B1 | 10/2001 | McIlwaine et al. | |
| 6,310,951 B1 * | 10/2001 | Wineberg et al. | 379/265.06 |
| 6,324,282 B1 | 11/2001 | McIllwaine et al. | |
| 6,340,977 B1 | 1/2002 | Lui et al. | 345/709 |
| 6,347,139 B1 | 2/2002 | Fisher et al. | |
| 6,356,632 B1 | 3/2002 | Foster et al. | 379/265.04 |
| 6,359,982 B1 | 3/2002 | Foster et al. | 379/266.06 |
| 6,371,765 B1 | 4/2002 | Wall et al. | |
| 6,408,064 B1 | 6/2002 | Fedorov et al. | |
| 6,408,066 B1 | 6/2002 | Andruska et al. | |
| 6,453,038 B1 | 9/2002 | McFarlane et al. | |
| 6,459,787 B1 | 10/2002 | McIllwaine et al. | |
| 6,510,221 B1 | 1/2003 | Fisher et al. | |
| 6,535,600 B1 | 3/2003 | Fisher et al. | |
| 6,553,114 B1 | 4/2003 | Fisher et al. | |
| 6,559,867 B1 | 5/2003 | Kotick et al. | |
| 6,584,192 B1 | 6/2003 | Agusta | 379/265.12 |
| 6,603,854 B1 | 8/2003 | Judkins et al. | |
| 6,628,777 B1 | 9/2003 | McIllwaine et al. | |
| 6,690,788 B1 * | 2/2004 | Bauer et al. | 379/242 |
| 6,704,410 B1 * | 3/2004 | McFarlane et al. | 379/265.05 |
| 6,766,012 B1 * | 7/2004 | Crossley | 379/265.02 |
| 6,771,764 B1 | 8/2004 | Dezonno | 379/265.02 |
| 6,771,765 B1 | 8/2004 | Crowther et al. | 379/265.09 |
| 6,775,377 B1 | 8/2004 | McIllwaine et al. | |
| 6,856,680 B1 * | 2/2005 | Mengshoel et al. | 379/265.06 |
| 6,865,267 B1 * | 3/2005 | Dezonno | 379/265.06 |
| 2002/0118220 A1 | 8/2002 | Lui et al. | 345/709 |
| 2003/0033184 A1 | 2/2003 | Benbassat et al. | |

FOREIGN PATENT DOCUMENTS

| | | |
|---|---|---|
| WO | WO 2000/68769 | 11/2000 |
| WO | WO 01/065525 A2 | 9/2001 |
| WO | WO 2005/011240 A1 | 2/2005 |
| WO | WO 2005/011243 A1 | 2/2005 |
| WO | WO 2005/020546 A2 | 3/2005 |

OTHER PUBLICATIONS

Armstrong, *Electronic Mail Order for Distance Learning*; IEEE Colloquium on Commercialising the Internet; pp. 4/1-4/4 Feb. 1997.

Call Center E-Journal; *Telvista Integrates eLearning and Quality Monitoring*; Aug. 2001; pp. 8-12.

Click2learn; *Click2learn Unveils New Platform; Takes Aim at e-Learning Industry's Shortcomings*; Press Release; Jun. 4, 2001.

Click2learn; *Aspen: The Next-Generation e-Learning Platform*; (2001).

Curilem et al.; *Considerations for the Design of a Tutoring System Applied to Diabetes*; Proceedings of the 22nd Annual EMBX International Conference; Jul. 23-28, 2000; pp. 2811-2814.

Cybulski et al.; *Teaching Systems Analysis and Design Using Multimedia and Patterns*; IEEE; 2000; pp. 113-122.

Envision Telephony; *Click2Coach*; (2001).

Envision Telephony; *What Makes Your Contact Center Agents Truly Effective*; (2001).

Fletcher, Scotty; *Companies turn to the Virtual Classroom*; dbusiness.com; May 25, 2000.

Granić et al.; *User Interface Aspects of an Intelligent Tutoring System*; 22nd Int. Conf. Information Technology Interfaces ITI 2000, Jun. 13-16, 2000; pp. 157-164.

Levinson et al.; *Chess Neighborhoods, Function Combination and Reinforcement Learning*; Institution of Electrical Engineers; 2003; INSPEC Abstract No. C2002-07-7830D-012.

NICE Systems; *NICE to Launch Integrated e-Learning Solution Through Partnership With Astound*; News Release; Dec. 4, 2000.

Skowronek, Larry; *Aspect eWorkforce Management v6*; Jul. 30, 2001.

Syntora.com; *Syntora Agentivity*; (2003); 14 pages.

Campbell, D. L., Guidelines for Field Evaluations of Repellents to Control Deer Damage to Reforestation, Special Technical Publication of American Society for Testing and Materials, vol. 625, 1977.

Bullard, Roger W. Preparation and Evaluation of a Synthetic Fermented Egg Coyote Attractant and Deer Repellent, J. Agric. Food Chem., vol. 26, No. 1, 1978.

Campbell, Dan L., Deer Repelled from Douglas Fir New Growth Using BGR-P and Aversive Conditioning, Department of Natural Resources Note, No. 46, Oct. 22, 1987.

Campbell, Dan L., Recent Approaches to Controlling Mountain Beavers in Pacific Northwest Forests, Denver Wildlife Research Center, Printed at Univ. of Calif., Davis 13: 183-187, 1988.

Affidavit of John McIlwaine dated Sep. 20, 2004.

Star Trainer; *Simulation Training for Call Center Agents*.

Knowlagent; *Knowlagent r7 Capabilities and Technologies Overview*; Jun. 10, 2004; pp. 1-20.

Knowlagent; Marketing document from website; www.knowlagent.com; (Aug. 2004).

Deloitte & Touche; *Tech Trends—2002 Annual Report*; (2002); vol. 1; pp. 23-26.

Knoa Software, Inc.; *Achieving Enterprise Application ROI by Managing User Performance*; Mar. 2003; pp. 1-12.

Knoa Software, Inc.; *Driving ROI From On-Demand Services*; Oct. 2003; 6 Pages.

Knoa Software, Inc.; *The knoa Guidance™ Application*; Apr. 2003; pp. 1-12.

\* cited by examiner

Performance Profiles

Agent A

| Performance Indicator | Target | Actual | Weight | Score | Index |
|---|---|---|---|---|---|
| Close ratio | 56% | 57% | 0 | 0 | |
| First Call resolution | 90% | 82% | 0 | 0 | |
| Quality | 95% | 96% | .3 | .288 | 1 |
| Average handling time | 56% | 57% | .7 | .399 | |
| Total Score | | | | .687 | |

Agent B

| Performance Indicator | Target | Actual | Weight | Score | Index |
|---|---|---|---|---|---|
| Close ratio | 56% | 56% | 0 | 0 | |
| First Call resolution | 90% | 88% | 0 | 0 | |
| Quality | 95% | 94% | .3 | .282 | 2 |
| Average handling time | 56% | 56% | .7 | .392 | |
| Total Score | | | | .674 | |

*Fig. 8*

AGENT TABLE FOR QUEUE 1

| Agent | Performance | | Qualifications | | | | | | | |
|---|---|---|---|---|---|---|---|---|---|---|
| | | | Traits | | Skills | | | | | |
| | | | | | Languages | | Products | | | |
| | Score | Index | Cognitive | Personality | Spanish | English | Flowers | Candy | Listening | Problem Solving |
| Agent A | .687 | 1 | High | Empathetic | P4 | P5 | P5 | P0 | P5 | P5 |
| Agent B | .674 | 2 | Average | Empathetic | P0 | P5 | P4 | P0 | P4 | P2 |
| Agent C | .5 | 5 | Average | Competitive | P0 | P5 | P5 | P4 | P5 | P1 |
| Agent D | .55 | 4 | Average | Aggressive | P5 | P5 | P4 | P2 | P2 | P3 |
| Agent E | .6 | 3 | Low | Empathetic | P0 | P5 | P4 | P0 | P1 | P0 |

*Fig. 10*

METHOD AND SYSTEM FOR SELECTING A PREFERRED CONTACT CENTER AGENT BASED ON AGENT PROFICIENCY AND PERFORMANCE AND CONTACT CENTER STATE

TECHNICAL FIELD

The present invention relates generally to contact centers, such as call service centers, for managing contact communications and, more specifically, to selecting a preferred agent to service a contact at a contact center.

BACKGROUND OF THE INVENTION

A contact center, such as a call center, is a system that enables a staff of agents to service telephone calls to or from customers or other constituents. Modern contact centers generally incorporate computer-based systems for handling calls and managing databases. The contact center usually maintains, and from time-to-time updates, a database of the qualifications of each agent that are readily available and relevant to servicing calls. Specialized product skills and foreign language fluency typify the information held in an agent database.

The contact center's computer-based systems typically route each incoming call to an agent who is available and qualified to service the call. Coupled to these systems are queues for holding incoming calls that await service by an available agent. The contact center typically organizes its agents into "queue groups;" each queue group consists of agents with similar qualifications and services calls from a queue. A highly qualified agent, for example, might be a member of two or more queue groups.

The center's computer-based systems assess and categorize each incoming call, for example in terms of a caller's product interest and language preference. Based on the categorization, a software program matches the call to an appropriate queue for service by an agent in the corresponding queue group. The queue holds the call until an agent from the queue group receives and services it. In short, the contact center categorizes and holds each incoming call for service by an appropriately qualified agent.

Conventional contact centers typically approach call handling from a timing perspective. When a queue holds multiple calls, the conventional contact center generally serves next the call that has been waiting longest. In other words, in each specified category of call, the next call served is typically the longest call waiting. When multiple agents in a queue group are idle and the queue that holds calls is empty, the conventional contact center typically routes the next incoming call to the agent who has been idle the longest.

The call-distribution function, commonly referred to as automatic call distribution ("ACD"), is generally implemented in software that executes in a switching system, such as a private branch exchange, that connects customer calls to agent telephones. The ACD component typically includes a software module, known as a rules-based distribution engine ("RBDE"), which categorizes each incoming call and selects an appropriate holding queue based on the categorization. In response to the RBDE's queue selection, the ACD places each incoming call in an appropriate queue. The RBDE's rules select the next call to be served from the queue and match that call with an available agent from the corresponding queue group. The ACD then activates a physical switch in the switching system that routes the call to the matched agent.

In modern contact centers, personnel interact with the center's component systems through a centralized system known as a computer/telephone integration system ("CTI"). The CTI system cooperates with the ACD and an intelligent voice response system ("IVRS") to acquire information about incoming calls. The IVRS queries each incoming caller regarding call purpose, product interest, and language requirements, for example. The ACD examines the call signal patterns to determine telephony aspects of a call such as the caller's location and telephone number. The IVRS deduces additional information about the call by referencing the information acquired by the ACD and the IVRS to the contact center's databases.

The conventional art includes various methods for selecting an agent to service an incoming call and thereby derive benefit for the center from the call-agent interaction. The conventional methods generally focus on a modified version of one of the conventional functions described above in this Background. The conventional art includes refined approaches to assessing incoming calls, to characterizing agent qualifications, and to matching the assessment of the call to the qualifications of the agents who are eligible to service the call. However, contact centers operate under dynamic situational and environmental factors and with agents whose individual performance and proficiencies change over time. In these conditions, the characteristics of the preferred agent to take a given call can vary significantly and the conventional methods exhibit shortcomings.

A contact center's call volume generally fluctuates, both predictably and unpredictably. When call volume is high, an agent with a history of handling calls quickly but with average quality may produce more value for the contact center than would an agent with a history of handling calls slowly but with high quality.

It is not uncommon for a contact center's management to alter the center's objectives. Management may gauge the center's operational effectiveness according to profit in one season and according to maximum number of customers served in a later season, for example. In the first season, an agent with a history of meticulously converting calls into high-dollar sales might make a larger contribution to the operational effectiveness of the contact center than would an agent with a history of rapidly converting calls into small-dollar sales. But for the later season, the fast-selling agent might make the larger contribution to the overall objective of the organization.

Agent qualifications generally change through training, experience, and management guidance. The change is sometimes rapid and unpredictable. For example, suppose an agent receives computer-based training during a 15-minute break to learn about a special promotional offer. The promotion just aired in an infomercial and inundated the center with inquiries. The center's operational effectiveness may be served by routing inquiries to the newly trained agent immediately following the 15-minute training break.

Agent qualifications are not always directly correlated to agent performance. For example, a highly qualified, highly trained agent might handle calls slowly. The slow-handling condition might be correlated to a situation or measurable parameter. For example, suppose an infomercial periodically airs a promotional offer that predictably triggers a backlog of impatient callers and a spike in call volume. Some agents, who are excellent performers on average, may buckle under the pressure. For these agents, performance may be linked to call volume.

Contact centers often monitor agent performance and describe that performance using several metrics. Typical metrics include handling time, quality, cross sales, first call resolution, and close ratio. Depending on the situation, each of these metrics may have a different relevance to the operational effectiveness of a contact center. In some situations, close ratio and, to a lesser degree, cross sales might both be relevant to operational effectiveness. For example, an infomercial might sell diamonds one hour and gold jewelry the next. During the diamond hour, when call volume is high and most agents are not idle, the contact center may have a need to direct calls to agents whose close ratios are high regardless of cross sales. During the gold-jewelry hour, when call volume is lower, the contact center may have a need to direct calls to agents who can sell gold jewelry with a reasonable close ratio and can effectively cross sell diamonds because more time can be spent on the call encouraging additional sales.

In sum, the conventional methods for selecting one agent over another to service a call at a contact center exhibit shortcomings related to responsiveness to dynamic conditions, to shifting management directives, to changing staff capabilities such as agent performance and proficiency, to multivariate performance metrics, to variations in the state of the contact center, and to indirect and intertwined relationships between factors in the selection process. Accordingly, a need exists for a method and system that can select a preferred agent to service a call and can factor into the selection methodology dynamic situational and environmental influences and shifting agent proficiency and performance.

SUMMARY OF THE INVENTION

The present invention supports selecting an agent to service and derive value from a contact at a contact center wherein the selection process accounts for the state of the contact center and the proficiency and performance of the contact center's agents. One aspect of a contact center's state can be situational and environmental factors that effect the center's operation. The present invention can couple to the information infrastructure of a computer-centric contact center and collect information relevant to the agent selection process. The center's computer-based components can supply the selection process with information as soon as it is available or on a real-time basis. This information can describe the performance or qualifications of each agent, the operational state or activity of the center, or situational factors relevant to the selection process. Through the incorporation of timely information, the selection process can respond to dynamic conditions in the contact center environment. A selection process that is highly responsive to state of the contact center can facilitate selecting an agent who, relative to other agents, will have a high degree of impact on the center's operational effectiveness.

According to one aspect of the present invention, the agent selection method can include a software program with an algorithm that considers multiple factors relevant to the agent selection process. The algorithm can weigh each factor according to its relative importance to the selection process. These factors can include indicators of agent performance and activity levels of the center. The algorithm can set the algorithmic weights according to rules based on management input. Alternatively, the algorithm can self-adjust the weights using software-based rules or other computations. The algorithm can account for interdependences between factors relevant to the selection process by scaling one or more factors on the basis of another factor. The contact center state, or a measurement thereof, can be the basis for adjusting the relative contribution of each of several agent-performance indicators. The algorithm can also select an agent on the basis of a single agent-performance indicator that is factored according to the state of the contact center.

According to one aspect of the present invention, a software program can select a preferred agent to receive a call at a contact center because the preferred agent's performance history predicts that he/she will realize greater value, or contribution to the center's operational effectiveness, from the call than will other agents. A software-based method can assign an index value, representative of rank, to each agent. When two or more pertinent metrics of agent performance are available, the method can consider both and weigh each in terms of relevance to operational effectiveness and efficiency. The method can include a computation that varies the weight of each metric according to dynamics in the contact center's operating conditions, or according to another indication of the contact center's state. The method can include a step determining the volume, or rate, of contacts serviced by the center. The method can also include a step of scaling each metric according to call volume.

According to one aspect of the present invention, several components in a computer-based contact center can interact with one another to select an agent to receive an incoming call. An agent monitor can provide two or more indicators of each agent's on-the-job performance. An activity monitor can provide a characterization of the contact center's activity. An assessment component can administer computer-based tests and determine each agent's qualifications. An agent selection component can acquire timely, and/or essentially real-time, information relevant to the selection process from the assessment component, the activity monitor, and the agent monitor. The agent selection component can process the information to select an agent who is predicted to, by servicing the contact, generate more value to the center than will other agents who are eligible to service the contact. By incorporating timely information into the selection of each agent, the contact center as a whole can improve its operational effectiveness, even in dynamic conditions.

According to one aspect of the present invention, one agent is selected to perform a task in a contact center on the basis of that agent's performance. The agent can be preferentially selected over another agent on the basis of performance history and predicted contribution to the contact center's goals. The selected agent can be the highest ranking agent in a group of agents.

According to one aspect of the present invention, an index value is used as the basis to select a resource to deploy in a contact center. The index value can indicate the relative contribution towards operation effectiveness of one resource deployment option relative to another.

The discussion of selecting agents presented in this summary is for illustrative purposes only. Various aspects of the present invention may be more clearly understood and appreciated from a review of the following detailed description of the disclosed embodiments and by reference to the drawings and claims.

BRIEF DESCRIPTION OF THE DRAWINGS

FIG. 8 is a table illustrating performance indicators and performance index values for agents at a computer-based contact center system in accordance with an exemplary embodiment of the present invention.

FIG. 10 is an exemplary table incorporating information pertinent to routing a call to a select agent in a computer-based contact center system in accordance with an exemplary embodiment of the present invention.

DETAILED DESCRIPTION OF EXEMPLARY EMBODIMENTS

Figure 1:
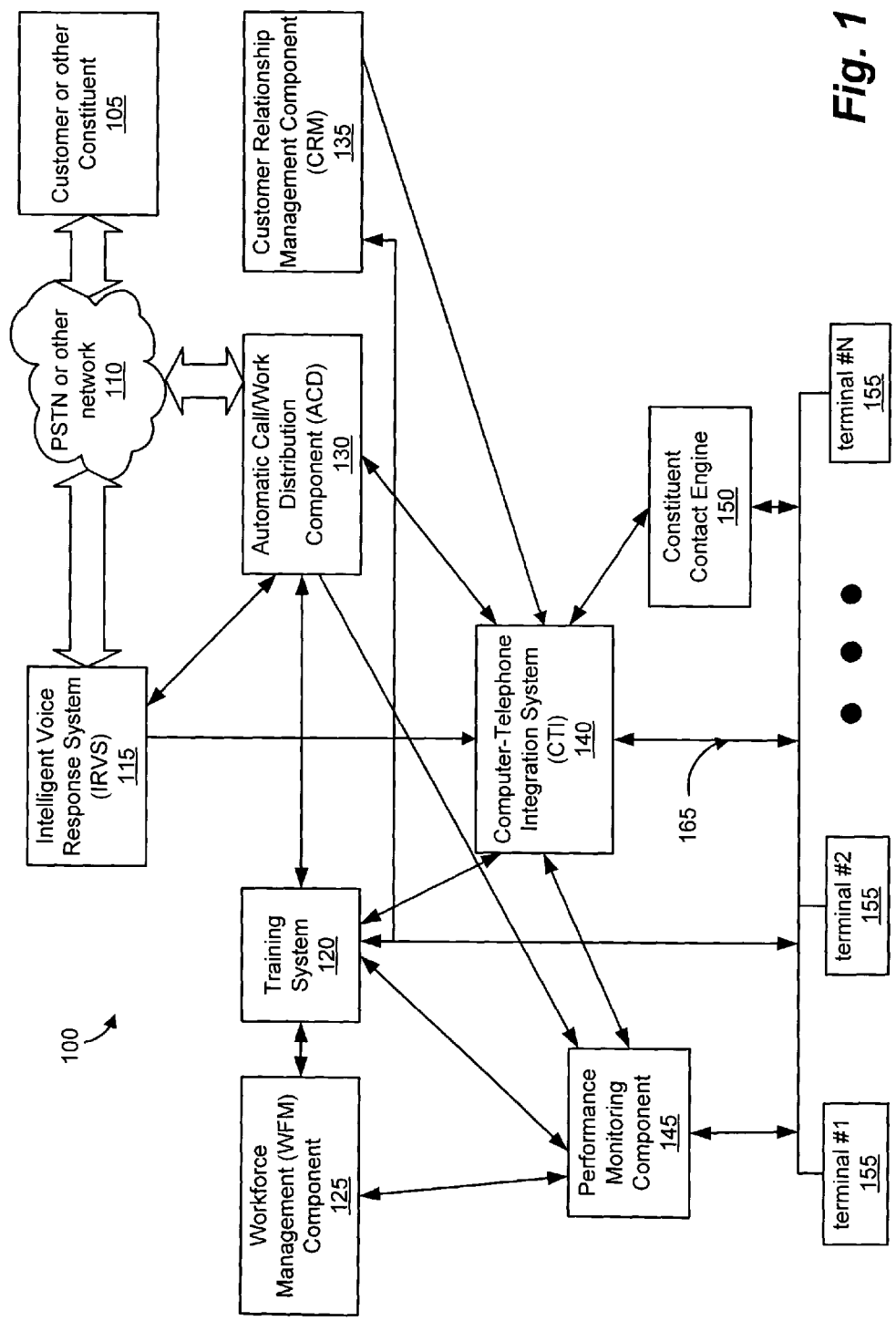
FIG. 1 is a block diagram illustrating a system for managing a computer-based contact center system in accordance with an exemplary embodiment of the present invention.

The present invention is directed to selecting one agent from a group of agents service a contact at a contact center. Selecting the agent with the performance record best suited for each individual contact, while also considering the center's state, can enhance a center's operational effectiveness.

The term "performance indicator," in respect to an agent, is used herein to refer to metrics of an individual agent's actual on-the-job performance. Performance indicators include quality, call handling time, first call resolution, cross-sell statistics, revenue per hour, revenue per call, calls per hour, and speed of answer, for example. Agent performance reflects an aspect of an agent's demonstrated service of a real contact.

Agent qualifications are distinct from agent performance. Agent qualifications reflect characteristics of an agent. Although agent qualifications are sometimes correlated to on-the-job performance, agent qualifications are not necessarily correlated to performance. For example, an agent who is highly trained on the technical aspects of diamonds may be an inept diamond seller as measured by actual, on-the-job performance. Agent qualifications include an agent's innate traits such as cognitive skills and personality. Agent qualifications also include an agent's skills and competencies. Foreign language fluencies, product expertise acquired by training in specific products, and listening skills are examples of an agent's skill and competency qualifications.

The term "state" or "contact center state" is used herein to refer to situational factors that can effect the contact center's overall operations. Contact center states include agent performance indicators that are aggregated to the entire center and/or the center's agent population. Other state examples include current call volume, historical call volume, and forecast call volume, each of which is sometimes described seasonally or over another increment of time. Further examples of contact center state include the center's overall customer satisfaction index, compliance statistics, revenue goals, actual revenue, service level, new product roll out schedules, management directives, natural disasters, and catastrophic events. This is not an exhaustive recitation.

The term "contact center" is used herein to include centers, such as service centers, sales centers, and call centers that service inbound calls and/or outbound calls. As further described below, a contact center can serve customers or constituents that are either internal or external to an organization, and the service can include audible communication, chat, and/or e-mail. A contact center can be physically located at one geographic site, such as a common building or complex. Alternatively, a contact center can be geographically dispersed and include multiple sites with agents working from home or in other telecommuting arrangements.

The agent-selection process can include monitoring each agent's performance and representing that performance on a scale. The performance can be represented as a performance indicator, such as a key performance indicator. The monitoring scale can be single dimensional so that it represents a single indicator. Alternatively, the scale can be a multidimensional scale that includes two or more performance indicator values, each representing a distinct, but potentially related, aspect of agent performance. The agent-selection process can include weighing each indicator value according to its relative importance to the center's operational effectiveness and efficiency. The weighting factor can also account for the center's state; the center's state can include the center's operating conditions, situations, environmental factors, and objectives. The process can include combining the weighted indicators into a single numerical score for each agent and creating a performance index for each agent by ranking the agents based on the performance score. The agent with the best index for the situation who is available or otherwise eligible to service the contact can be selected as the preferred agent to service the contact.

For example, suppose a contact center sells flowers and defines operational effectiveness in terms of weekly sales. Call volume is a state of the center. In early February, call volume approaches the center's upper capacity limit and the majority of callers will quickly place a Valentine's flower order without regard to agent salesmanship. However, in mid-May the contact center caters to the prom market. May call volume is low and the typical caller must be cajoled into a flower selection. To best serve operational effectiveness in February, the contact center can preferentially direct calls to the agent that quickly handles calls, even if the agent's yearly "close ratio" is mediocre. To best serve operational effectiveness in May, the contact center can preferentially direct calls to the agent with the best close ratio, even if that agent's average "call handling time" is mediocre.

The present invention can provide an agent selection process that improves the operational effectiveness and efficiency of the floral contact center in the example. The present invention can generate an index that is a predictor of each agent's relative sales contribution and average handling time based on call volume for a specific call. In other words, routing a call to an agent with a high index, meaning the agent performs well on sales type calls, is more likely to serve operational effectiveness than routing a call to an agent with a low index who has displayed weaker performance on sales calls in the past. An algorithm that generates the index weights applies a weighting factor to the close ratio indicator and the handling time indicator of each agent according to the center's state, which in this example is call volume. For this example, when call volume is high, the algorithm can compute an index that emphasizes handling more than close ratio. When call volume is low, the algorithm can compute an index that emphasizes close ratio more than handling time. Stated another way, the present invention can compute an agent-selection index that is a function of a plurality of agent performance metrics and a center's state. The state can include operational objectives such as management dictated goals.

The present invention can also apply agent-selection rules to agent qualification data that are stored in the contact center and are available through the contact center's information infrastructure. Agent qualifications can include innate traits, such as personality and cognitive ability that are typically stable throughout an agent's employment. Agent qualifications can also include skills and competencies that evolve during employment and sharpen through training and experience, such as language fluency, problem resolution, product expertise, and listening skills. The present invention can access skills and competencies information as they evolve, on a near-real-time or an as-updated basis. In addition, the present invention also identifies and stores innate traits to use in determining the best agent to field specific inquiries. For example, if an agent prefers non-routine activities, then a center may opt for that agent to service irregular calls or escalations to promote the agent's long-term job satisfaction.

A typical computer-based contact center is an information rich environment. A network of data links facilitates information flow between the center's component systems. By tapping this network, the present invention can access real-time information from various center components and utilize it in the agent selection process. Consequently, the present invention can be immediately responsive to new situations in the contact center environment, to fluctuations in contact center activity, and to other changes in the center's state. Pertinent agent performance information can include measurements of close ratio, first call resolution, quality, and handling time. Contact center state information that is relevant to agent selection can include aggregate agent-specific performance statistics and measurements of current call volume, historical call volume, predicted call volume, revenue, customer satisfaction statistics, and other center environmental factors. Operation effectiveness can include goals and management objectives such as profit targets and other performance targets.

Although the preferred embodiment of the invention will be described with respect to selecting an agent to take an incoming call at a contact center, those skilled in the art will recognize that the invention may be utilized in connection with the deployment of a variety of resources in other operating environments. One example other than a traditional call center environment is a technical support center within an organization that serves employees or members. Those skilled in the art will further recognize that the present invention may be utilized in connection with servicing inbound and outbound contacts at a contact center.

More generally, the business function provided by a contact center may be extended to other communications media and to contact with constituents of an organization other than customers. For example, an e-mail help desk may be employed by an organization to provide technical support to its employees. Web-based "chat"-type systems may be employed to provide information to sales prospects. When a broadband communications infrastructure is more widely deployed, systems for the delivery of broadband information, such as video information, to a broad range of constituents through constituent contact centers will likely be employed by many organizations.

Turning now to the drawings, in which like numerals indicate like elements throughout the several figures, an exemplary embodiment of the invention will be described in detail.

FIG. 1 illustrates a system for managing a contact center in which one advantageous embodiment of the present invention is implemented. A contact center 100 includes an arrangement of computer-based components coupled to one another through a set of data links 165 such as a network 165. While some contact center functions are implemented in a single center component, other functions are dispersed among components. The information structure of the contact center 100 offers a distributed computing environment. In this environment, the code behind the software-based process steps does not necessarily execute in a singular component; rather, the code can execute in multiple components of the contact center 100.

In a typical application of the contact center 100, a customer or other constituent 105, calls the contact center 100 via the public switched telephone network ("PSTN") or other network 110. The customer may initiate the call in order to sign up for long distance service, inquire about a credit card bill, or purchase a catalog item, for example.

Modern contact centers 100 integrally manage customer phone calls and relevant database information through what is known as a computer/telephone integration system ("CTI") 140. Two contact center components, an intelligent voice response system ("IVRS") 115 and an automatic call/work distribution component ("ACD") 130, collaborate with the CTI 140 to acquire information about incoming calls and prepare them for subsequent processing in the contact center.

The IVRS 115 queries each incoming caller to ascertain information such as call purpose, product interest, and language requirements. The IVRS 115 typically offers the caller a menu of options, and the caller selects an option by entering a key code or speaking a recognizable phrase.

The ACD 130 detects telephony information from a call without intruding upon the caller. The ACD 130 can determine a caller's telephone number and location, for example. The ACD 130 transfers the telephony information to the CTI 140, which references the information to a database and deduces additional information describing the call. The CTI 140 can compare caller location to a demographic database and predict a caller's annual income, for example. The CTI 140 might also identify the caller as a repeat customer and categorize the caller's historical ordering patterns. The CTI 140 typically updates a customer database with newly acquired information so that components of the contact center 100 can handle incoming calls according to up-to-date information.

In addition to acquiring telephony information about a caller, the ACD 130 distributes calls within the contact center 100. ACD software generally executes in a switching system, such as a private branch exchange. The private branch exchange connects customer calls to terminals 155 operated by contact center agents who have been assigned to answer customer complaints, take orders from customers, or perform other interaction duties. The ACD 130 maintains one or more queues for holding incoming calls until an agent is selected to take the call and the call is routed to the agent. In the case of multiple queues, each queue typically holds a unique category of caller so that each caller is placed on hold in exactly one queue. The ACD's role in selecting an agent to receive an incoming call will be described in detail below.

In alternative embodiments of the invention, the function of the ACD 130 can be replaced by other communications routers. For example, in a contact system 100 using email, an email server and router can distribute electronic messages.

Terminals 155 typically include a telephone and a contact center computer terminal for accessing product information, customer information, or other information through a database. For example, in a contact center 100 implemented to support a catalog-based clothing merchant, the computer terminal 155 for an agent could display static information regarding a specific item of clothing when a customer 105 expresses an interest in purchasing that item. Agents can also view information about the call that the ACD 130 and the IVRS 115 compiled when the call first came into the contact center 100. A desktop application, which is usually a CRM component 135, facilitates an agent's interaction with a caller.

The contact center's communication network 165 facilitates information flow between the components. For a contact center 100 in which all elements are located at the same site, a local area network may provide the backbone for the contact center communication network 165. In contact centers 100 with geographically dispersed components, the communications network 165 may comprise a wide area network, a virtual network, a satellite communications network, or other communications network elements as are known in the art.

A typical contact center 100 includes a workforce management component ("WFM") 125. The WFM component 125 manages the staffing level of agents in the contact center 100 so that contact center productivity can be optimized. For example, the volume of calls into or out of a contact center 100 may vary significantly during the day, during the week, or during the month. The WFM component 125 can receive historical call volume data from the ACD 130 and use this information to create work schedules for agents. The ACD 130 is one type of activity monitor in the contact center 100. The historical call volume data can be used to predict periods of high call volume and/or other states of the center. The center's operational functions can be adjusted according to the state. Adjustments of operational functions include selecting a resource to deploy, for example selecting one agent over another to service a contact.

A typical contact center 100 also includes a customer relationship management ("CRM") component 135, which interacts with the CTI 140. The CRM component 135 manages customer databases and derives useful information, for example identifying customer purchase patterns. In addition to managing traditional customer information, the CRM component 135 can assess incoming calls, for example to predict the nature of the call or the likelihood of an order. The CRM component 135 conducts this assessment by comparing information acquired from the call to information stored in the center's databases.

In a typical contact center 100, a performance monitoring component 145 provides measurements and indications of agent performance that are useful to management and to the various components in the contact center 100. Performance monitoring includes but is not limited to quality monitoring and does not always entail monitoring recorded calls.

The performance monitoring component 145 also typically determines the level of agent skill and competency in each of several areas by accessing information from the center components that collect and track agent performance information. Examples of these components include, but are not limited to, the CRM component 135, the training system 120, the WFM component 125, the ACD 130, and a quality monitoring system. The relevant skills and competencies for a contact center 100 serving a catalog clothing merchant could include product configuration knowledge (e.g. color options), knowledge of shipping and payment options, knowledge of competitor differentiation, finesse of handling irate customers, and multilingual fluency. In one embodiment, the performance monitoring component 145 stores performance-related information from the center's component systems in a dedicated database and the ACD 130 accesses the dedicated database for call routing decisions.

The training system 120 also accepts performance monitoring input from the performance monitoring component 145 as feedback for agent training programs. The training system 120, according to one embodiment of the present invention, is implemented in software and is installed in or associated with the communications network 165. Under the control of contact center management, the training system 120 can assign training materials to agents and deliver those training materials via communications network 165 to terminals 155 operated by the agents. Integration with the other contact center components enables the training system 120 to deliver the training materials to agents at times when those agents are available and when training will not adversely impact the contact center's operations.

The training system 120 is also in communication with the performance monitoring component 145 through the communications network 165 so that appropriate training materials may be delivered to the agents who are most in need of training. Proficient agents are thus spared the distraction of unneeded training, and training can be concentrated on those agents most in need and on areas of greatest need for those agents. Advantageously, contact center management may establish pass/fail or remediation thresholds to enable the assignment of appropriate training to appropriate agents. This functionality may be provided within the performance monitoring component 145. Preferably, agent skills that are found to be deficient relative to the thresholds are flagged and stored in a storage device within the performance monitoring component 145.

In one embodiment of the present invention, the performance monitoring component 145 is a system that is physically dispersed in the contact center 100. In this configuration, the performance monitoring component system 145 can include the system components in the contact center that contain agent performance information such as average handling time, close ratio, quality, etc. The training system 120 uses the performance monitoring data to ascertain the performance gaps that exist for one or more agents and assigns training to address those gaps. One or any combination of performance metrics can be analyzed to determine the need for training. For example, if an agent's revenue per call is less than $50 and the agent's average handling time is greater than 45 seconds, then the training system 120 could assign course ABC.

The training system 120 can assess various aspects of an agent's qualifications. By administering a traits test, the training system 120 characterizes an agent's personality and cognitive abilities. The training system 120 typically administers a traits test only once for each agent, since for most agents, cognitive ability and personality do not change dramatically during employment. By administering a skills and competencies test, the training system 120 can identify knowledge gaps and determine agent qualifications that improve with training and on-the-job experience.

With an understanding of agent's skills and competencies, training can be administered to improve skills and competencies. Once the training is administered, an assessment can be provided to ensure the agent understood and retained the information. In addition, the agent's performance can be monitored to determine if performance has changed based upon the acquisition of the new information. When the agent's performance has changed, the training system can automatically update the agent's skills and competencies maintaining a near real time view of agent qualifications.

In tandem with the performance monitoring component 145, the training system 120 can determine if an agent effectively practices the subject matter of a completed training session. Immediately following a computer-administered test, the present invention can provide the results throughout the contact center's information network infrastructure 165. The ACD 130 and other center components access agent qualifications essentially in "real time." Consequently, the present invention can advantageously base call-routing decisions on real-time information related to agent qualifications.

Figure 2:
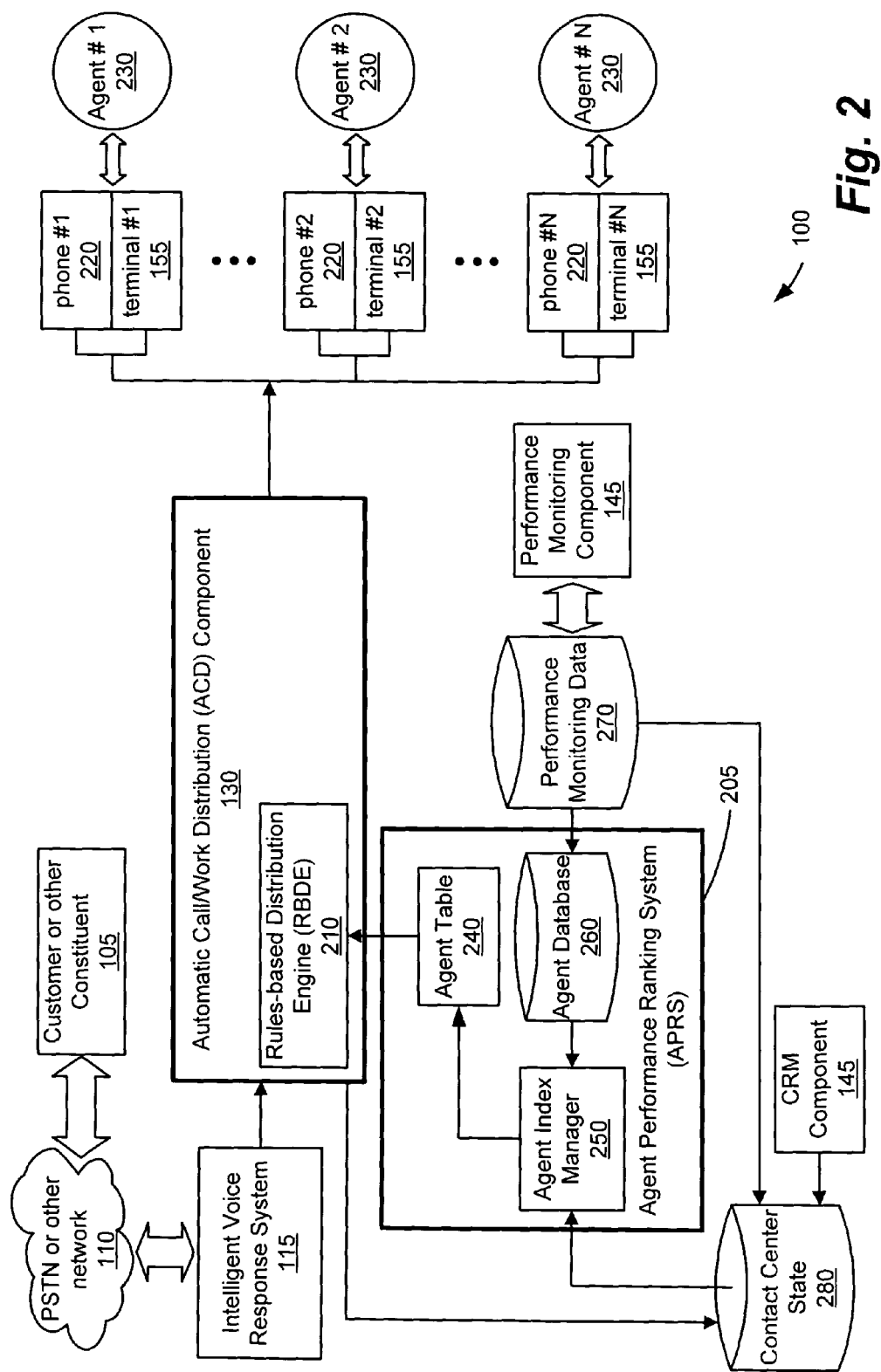
FIG. 2 is a block diagram illustrating a computer-based contact center system that includes an agent performance ranking system in accordance with an exemplary embodiment of the present invention.

FIG. 2 illustrates a contact center system 100 that includes a performance ranking system 205. Although the present invention supports numerous types of performance ranking systems 205, the illustrated performance ranking system 205 is an agent performance ranking system ("APRS") 205 that assigns a performance rank, or index, to each agent 230 in a group of agents 230. The APRS 205 communicates the index to the ACD 130 via an agent table 240 so that the ACD 130 can apply the index to call distribution decisions.

Call distribution, as illustrated in FIG. 2, is only one exemplary application of the index. Other useful applications of the index include using it for managerial actions, such as scheduling workflow, staffing decisions, and defining compensation, the index helps evaluate alternatives. The index offers feedback to process control algorithms in contact center components, such as the training system component 120 and the constituent contact system component 150. On the basis of feedback from the index, the process control algorithms can automatically compensate for dynamic conditions in the contact center environment. The index can also rank various contact center resources in terms of the predicted benefit of each resource's deployment so that one resource can be preferentially selected for deployment over another.

Upon receipt of an incoming call from a customer or other constituent 105, the ACD 105 categorizes the call; identifies, on the basis of the categorization, a specific queue to hold the call; places the call in the specific queue; selects one agent 230 to service the call from a group of agents assigned to service the specific queue; and, by activating a physical switch, routes the call to the select agent 230. The ACD 105 includes a rules-based distribution engine ("RBDE") 210 that categorizes the call by applying categorization rules to the information that is known about the call. Based on the categorization, the ACD 105 places the call in one of several queues. In other words, each queue holds a specific category of call. For example, one queue might hold calls from Spanish-speaking callers 105 seeking to order flowers while another queue might hold calls from English-speaking callers 105 seeking to order candy.

A group of agents 230, which are a subset of the total pool of the agents 230 in the contact center 100, services a given queue. This group is referred to herein as a "queue group." An individual agent 230 can be a member of multiple queue groups so as to service multiple queues. In other words, a single agent 230 can be qualified to receive calls from multiple queues. For example, a multi-lingual agent 230 with both candy and flower product skills, might take calls from both of the queues described in the preceding example.

The incoming call waits in a queue until the ACD 105 routes the call to an available agent. When the agent 230 receives the call, the agent communicates with the caller over a telephone 220 while entering and receiving information from a computer terminal 155.

The RBDE 210 includes software algorithms that select one agent 230 from the queue group to receive the incoming call. The software algorithm selects the agent 230 on the basis of the agent's index. In other words, the software algorithm matches the call to the agent 230 with the performance history that best supports the specific nature of the call and the center's operational effectiveness and efficiency objectives. Increasing year-end profit by 15% is an example of an operational effectiveness objective for a contact center 100.

In one embodiment of the present invention, the algorithm considers agent availability as a factor in the agent-selection process. For example, the algorithm may restrict its selection to agents 230 that are currently waiting to receive an incoming call. In one embodiment, the algorithm considers the potential value of the call. For example, the algorithm may preferentially route high-value calls to agents 230 with a history of realizing a high level of value from such calls. In one embodiment, the algorithm considers agent workload. For example, the algorithm may adjust its selection to avoid over-working higher performing agents 230 or under-working lower performing agents 230.

In an embodiment of the present invention illustrated by FIG. 2, the APRS 205 computes the index and transmits it to the ACD 130 over the contact center network 165. The APRS 205 is coupled to the contact center information infrastructure 165 so the index computation can include any information relevant to the contact center's operation as a computational factor. Furthermore, the APRS 205 can aggregate real-time information from multiple sources within the contact center environment. Through this comprehensive information access, the APRS 205 can adjust the index according to dynamic operational conditions, both internal and external to the contact center 100. For example, if market dynamics or management shifts the center's operational objectives, the APRS 205 adjusts the index accordingly. The APRS 205 can respond to these dynamic state conditions by either automatically adjusting the index or tuning the index according to management input.

The performance monitoring component 145 stores performance monitoring data 270 in a storage device 270, such as a bulk storage drive or the hard drive of a LAN server, where the data is readily accessible to the APRS 205 and its computational algorithms. The data 270 includes raw performance statistics as well as aggregated statistics and derived metrics. The storage device 270 also stores performance-related information from components in the contact center 100 other than the performance monitoring component 145. For example, the storage device 270 stores handling time statistics that are tracked by the ACD 130 and performance monitoring metrics that are computed on the basis of handling time by the performance monitoring component 145. In one embodiment of the present invention, the stored data 270 includes such indicators as: close ratio, first call resolution, quality, complaint ratio, cross-sales rate, revenue per call, and average handling time for each agent 230.

The APRS 205 maintains an agent database 260 of agent-specific data for timely access by its performance ranking algorithms. The database 260 includes agent performance indicators such as close ratio, first call resolution, quality, and average handling time and agent qualifications such as personality, cognitive abilities, and skills and competencies. The APRS 205 updates the agent database 260 as soon as new information is available from the various computer-based components in the contact center 100. In one embodiment of the present invention, the agent database 260 preferentially includes real-time data regarding agent qualifications and performance indicators.

The APRS's performance ranking algorithms also access contact center state 280 stored on a storage device 280. Contact center state 280 includes contact center activity information such as aggregate agent-specific performance statistics and measurements of current call volume, historical call volume, predicted call volume, revenue, and customer statistics. Accordingly, various components in the center 100 can function as an activity monitor.

The APRS 205 includes an agent index manager 250 that implements the performance ranking algorithms and computes the index. The agent index manager 250 organizes the index and qualifications of each agent 230 into an agent table 240, which is typically an electronic data file. The agent index manager 250 also formats the agent table 240 so that the ACD 210 can readily interpret it. The APRS 205 transmits the agent table 240 to the ACD 130. Alternatively, the ACD 210 retrieves the table from the APRS 205. The ACD's RBDE 210 applies selection rules to the agent table 240, whereby the index is a significant factor in selecting a preferred agent 230 to take an incoming call that is held in a queue.

In one embodiment of the present invention, the RBDE rules out the agents 230 in a queue group who are actively servicing a call and considers the remaining agents 230 strictly on the basis of the highest index. In another embodiment, the algorithm considers agents 230 who are actively servicing a call and expected to complete the call within a defined time period.

In another embodiment, the RBDE's agent-selection rules consider the qualifications of the agents 230 in a queue group in addition to agent index. In other words, the present invention supports routing using only the index or routing using a combination of qualifications and index. As members of a specific queue group, all of the agents 230 in the queue group have already met a first threshold of qualifications. By applying additional selection criteria to the queue group, the RBDE 210 essentially ranks, or otherwise segments, the queue group by qualification level.

For example, all of the agents 230 in a specific queue group might speak Spanish with acceptable fluency and exhibit acceptable flower-selling skills, where acceptable is defined as proficiency level P3 or better on a scale of P0 to P5. The RBDE agent-selection rules can preferentially select an agent 230 to receive a call if the agent 230 has a high index and flower-selling skills of P5. Additional agent-selection rules can identify the caller 105 as a repeat customer with a history of placing both candy and flower orders. Recognizing this purchase pattern, the RBDE agent-selection rules can select a preferred agent 230 in two steps. In the first step, the selection rules can identify a subgroup of agents 230 in the queue group who have flower selling skills of P4 or P5 and candy selling skills of P2 or better. In the second step, the selection rules can select the agent 230 in the subgroup with the highest index. The present invention can create combinations of selection rules based on one or many parameters in the agent table.

Those skilled in the information-technology, computing, or contact center arts will recognize that the components, data, and functions that are illustrated as individual blocks in FIG. 1 and FIG. 2 and discussed above are not necessarily well defined modules. Furthermore, the contents of each block are not necessarily positioned in one physical location of the contact center 100. In one embodiment of the present invention, the blocks represent virtual modules, and the components, data, and functions are physically dispersed. For example, in one embodiment of the present invention, the contact center state 280, the performance monitoring data 270, and the agent database 260 are all stored on a single computer readable medium that can be offsite of the contact center 100. In one embodiment of the present invention all of the computations related to selecting an agent 230 to receive a call are stored on a single computer readable medium and executed by a single microprocessor. In yet another embodiment, multiple contact center components each execute one or more steps in the agent selection process. In general, the present invention can include processes and elements that are either dispersed or centralized according to techniques known in the computing and information-technology arts.

Processes and components of an exemplary embodiment of the present invention will now be described in reference to FIGS. 3–00. The present invention includes multiple computer programs which embody the functions described herein and illustrated in the exemplary flow charts and tables of FIGS. 3–00. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary data tables and flow charts and associated description in the application text, for example.

Therefore, disclosure of a particular set of program code instructions is not considered necessary for an adequate understanding of how to make and use the invention. The inventive functionality of the claimed computer program will be explained in more detail in the following description in conjunction with the remaining figures illustrating the functions and program flow.

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 3:
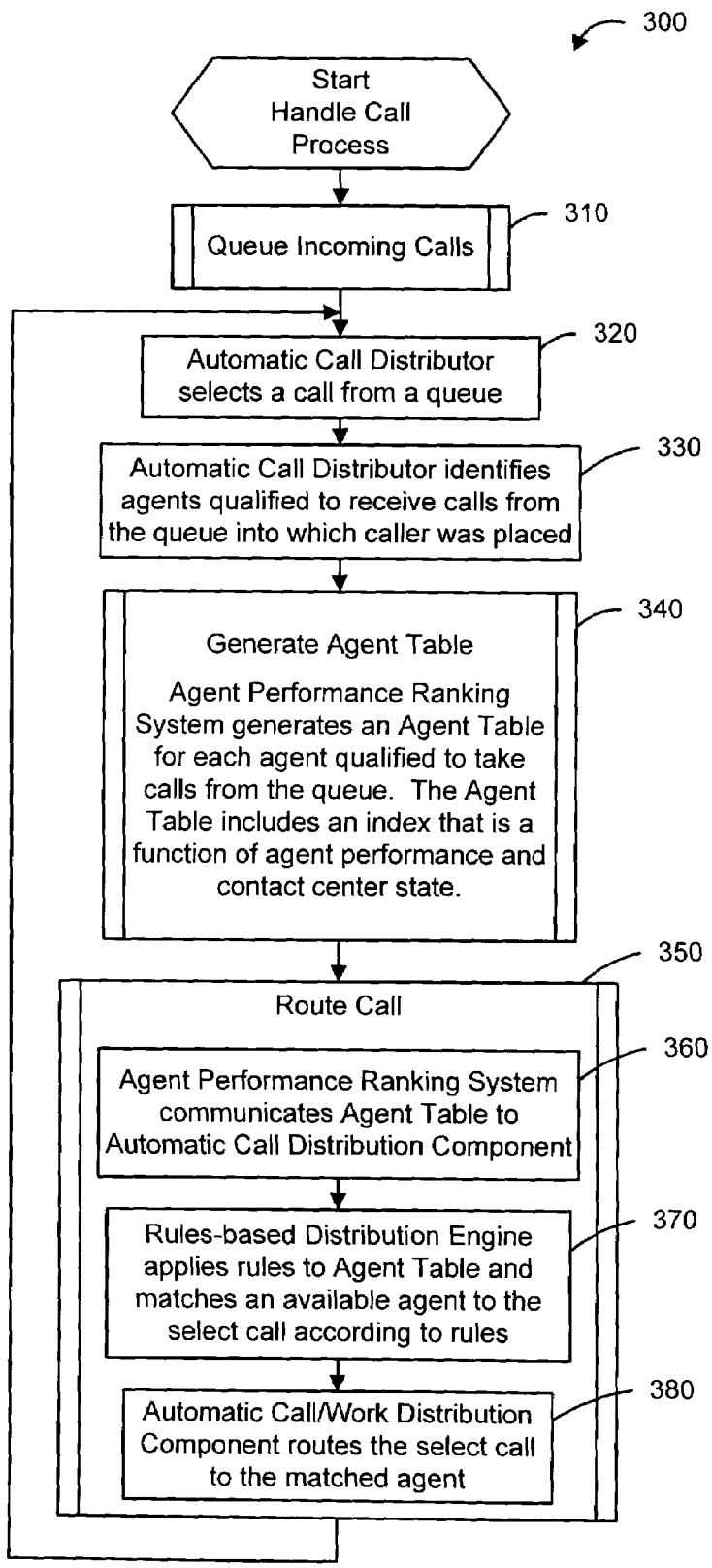
FIG. 3 is a flow chart illustrating steps in a process for routing incoming calls at a computer-based contact center system to select agents in accordance with an exemplary embodiment of the present invention.
Figure 5:
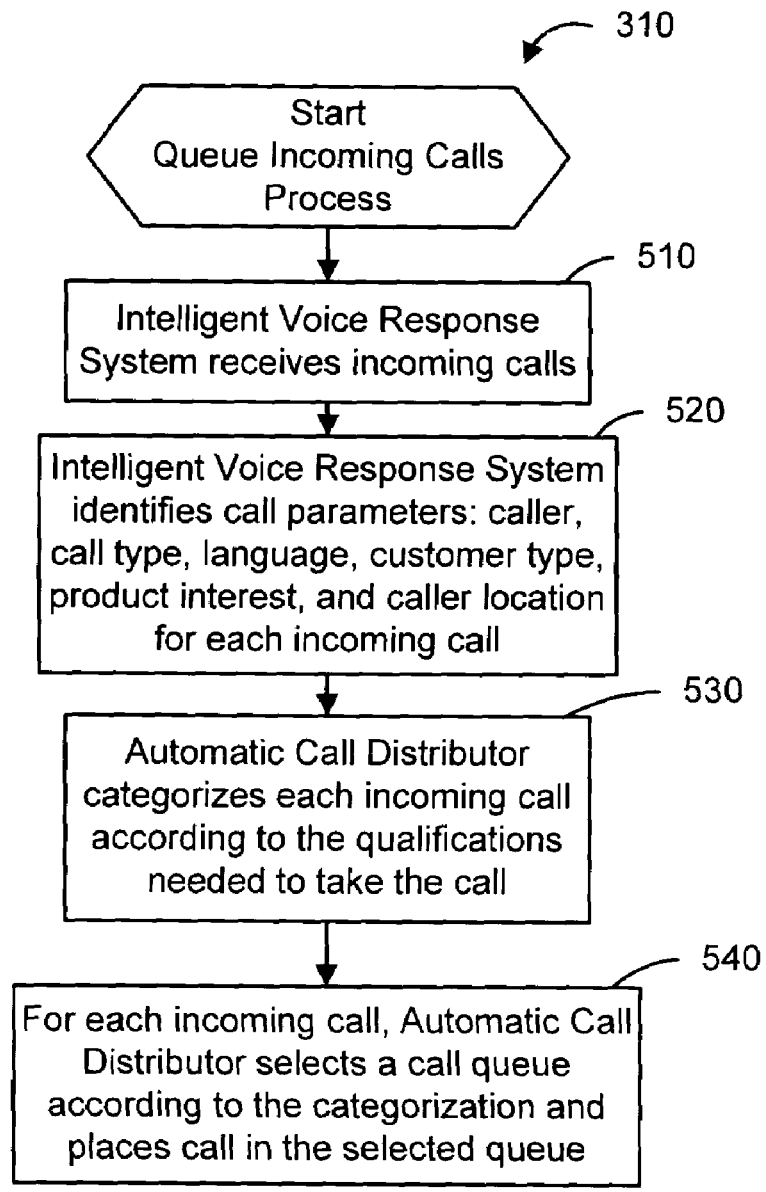
FIG. 5 is a flow chart illustrating steps in a process for queuing incoming calls at a computer-based contact center system in accordance with an exemplary embodiment of the present invention.

FIG. 3 is a flow chart illustrating an exemplary process 300, titled Handle Call, for receiving incoming calls and routing incoming calls to select agents 230. Step 310 is the first step of the Route Call process 300. Step 310 is a sub-process, titled Queue Incoming Calls, that FIG. 5 illustrates in further detail. In Step 310, the ACD 130 places each call in a queue. The ACD 130 selects the queue according to the RBDE's rules. The queue holds the call until the ACD 130 selects an agent 230 from the queue's queue group to service the call and routes the call to that agent 230.

In Step 320, which follows Step 310, the ACD 130 selects a call from a queue according to rules in the RBDE 210. The length of time that the call has been on hold is preferably a factor in selecting the call. In one embodiment of the present invention, call type is a factor in selecting the call. For example, repeat customers 105 can be given preference over new customers 105.

In Step 320, the ACD 120 selects a call from a given queue. In the next step, Step 330, the ACD 130 identifies the agents 230 who are eligible, based on their qualifications, to service that call. More specifically, in Step 330, the ACD 130 identifies the agents 230 who are members of the queue group that is assigned to the given queue. The queue group that is assigned to service calls from that given queue is made up of agents 230 whose qualifications meet the needs of the calls in the queue.

Steps 310–330 are described above using the example of a queue that is operative to holding incoming calls and a queue group that is made up of agents 230 who service calls from a specific queue. In an alternate embodiment of the present invention, there two types of queues in the contact center 100. A call queue holds calls that await service and an agent queue holds agents 230 who await calls. To avoid confusion and since those skilled in the contact center arts can readily practice the present invention in a multi-queue-type environment based on the contents of this paper, multi-queue-type applications and environments of the present invention will not be further discussed.

Step 340 is a sub-process titled Generate Agent Table in which the APRS 205 generates an agent table 240 that holds information regarding each agent 230 in the queue group. The agent table 240 includes an index value and list of qualifications for each agent 230. Subsequent figures and text describe Step 340 in further detail.

Step 350 is another sub-process that is titled Route Call that includes three illustrated steps. In the first step, Step 360, the APRS 205 communicates the agent table 240 to the ACD 130. The APRS 205 can communicate the agent table 240 to the ACD 130 in a number of ways. In one embodiment, the APRS 205 transmits the table, either by its own initiation, or in response to a prompt from the ACD 130. In another embodiment, the ACD 130 retrieves the table from the APRS 205, either by its own initiation, or in response to a prompt from the ACD 130. The table can be either pushed to the ACD 130 or pulled from the APRS 205. In another embodiment, the ACD 130 can store, and regularly update, the table on a hard drive so that the APRS 205 can readily access it.

In the second step, Step 370, the APRS 205 applies the RBDE 210 to the agent table 240. The RBDE 210 matches an available agent 230 to the queued call that Step 320 selected for service. The RBDE 210 preferably selects the agent 230 on the basis of index so that the RBDE 210 gives selection preference to agents 230 whose performance is above the queue group average. In one embodiment, the RBDE 210 selects the best performing, most qualified agent 230 that is available and eligible to service the call. In the third step, Step 380, the ACD 130 routes the call to the selected agent 230 by actuating a physical switch.

The Handle Call Process 300 generally executes Step 310 and Steps 320–380 throughout the contact center's operating hours. Step 310 repetitively queues incoming calls as they arrive at the contact center 100. Steps 320–380 repetitively distribute calls that are held in a queue to select agents 230.

Figure 4:
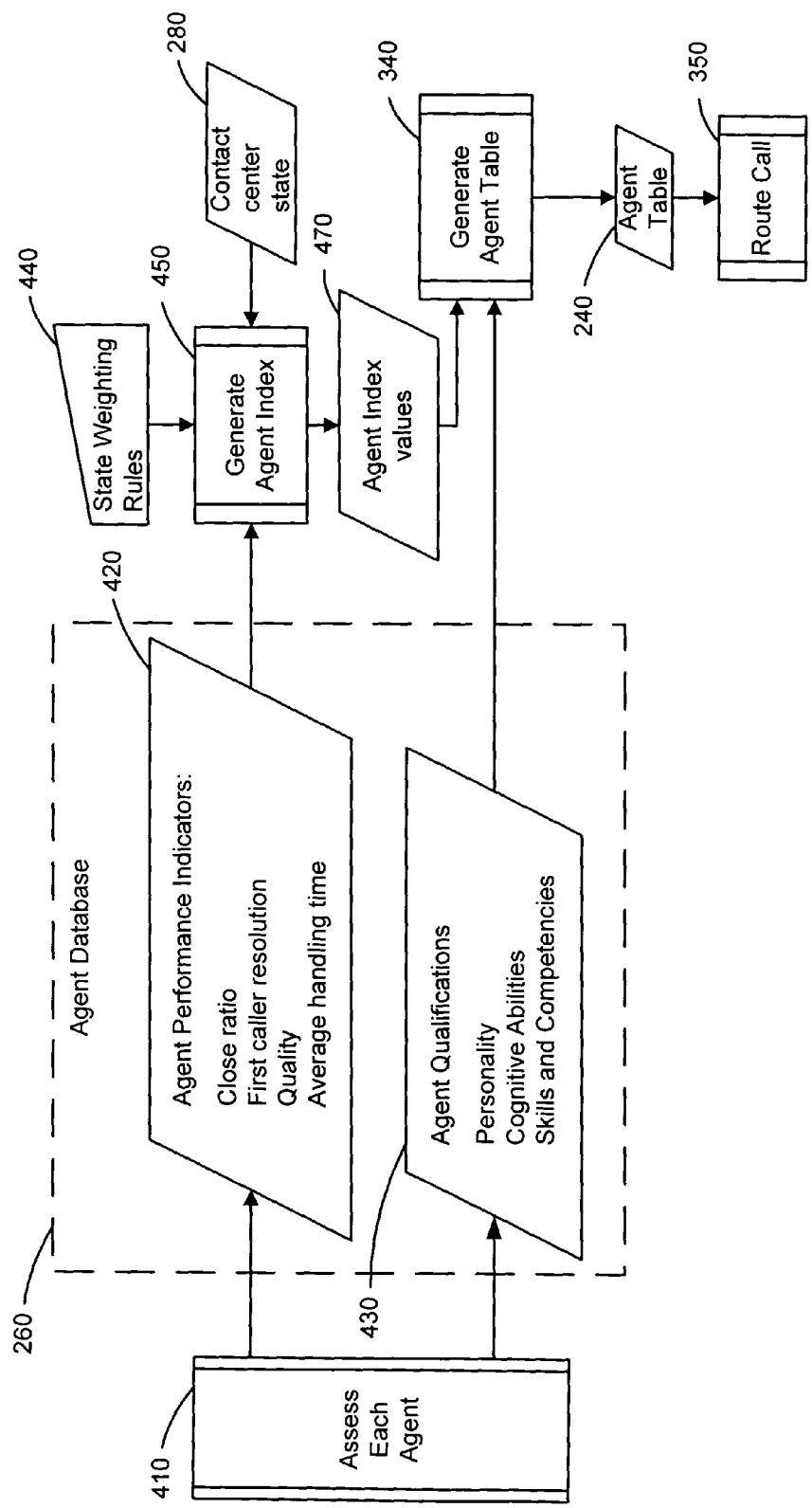
FIG. 4 is a block diagram illustrating relationships between sub-processes of a process for routing incoming calls at a computer-based contact center to select agents in accordance with an exemplary embodiment of the present invention.

FIG. 4 is a block diagram that illustrates the relationships between exemplary sub-processes in one embodiment of the present invention. The illustrated sub-processes generally correspond to the steps in Handle Call Process 300.

Figure 6:
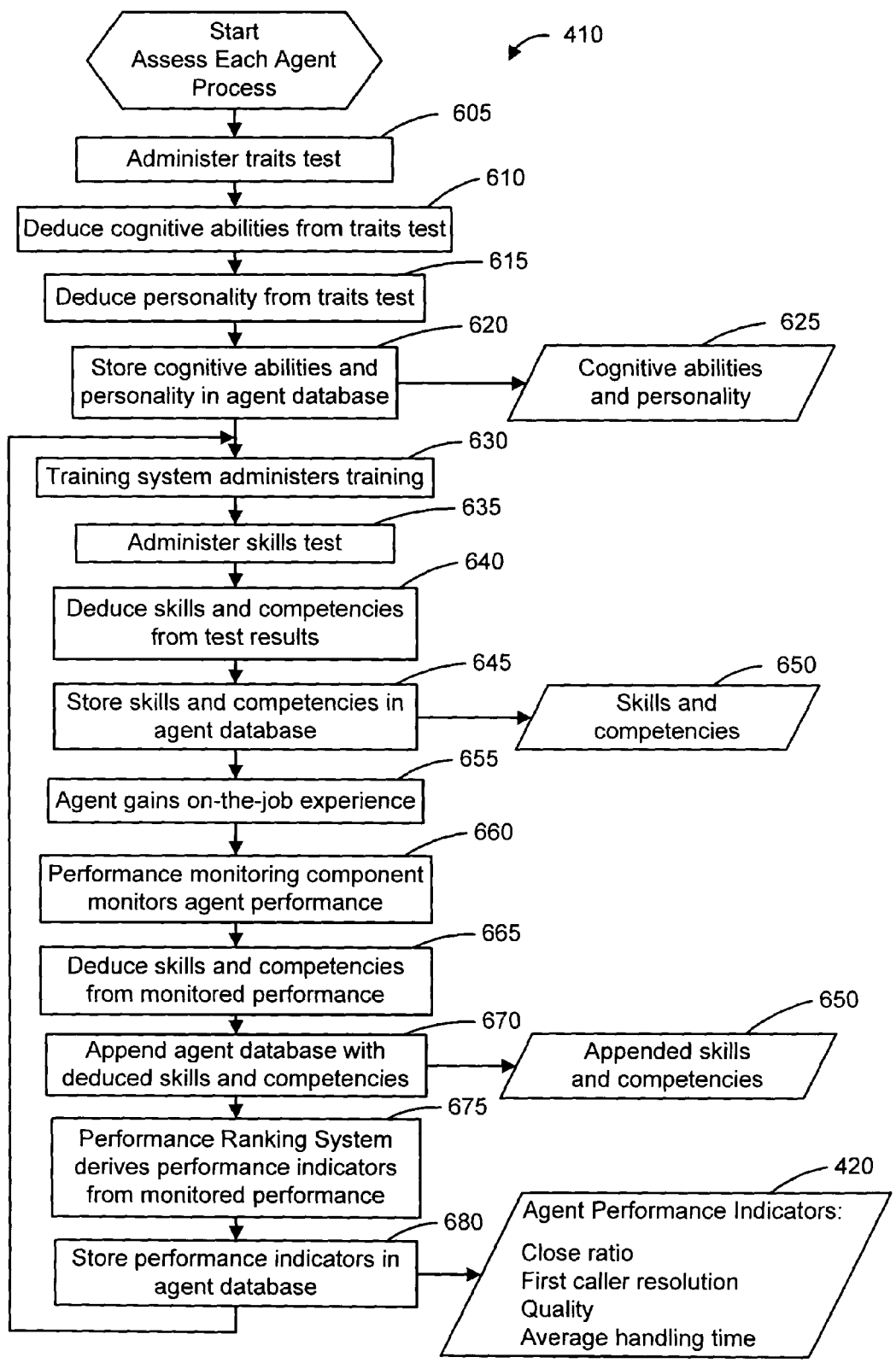
FIG. 6 is a flow chart illustrating steps in a process for assessing agents at a computer-based contact center system in accordance with an exemplary embodiment of the present invention.

The Assess Each Agent process 410, which FIG. 6 illustrates in further detail, outputs agent performance indicators 420 and agent qualifications 430. Agent performance indicators 420 include close ratio, first call resolution, quality, and average handling time. Agent qualifications 430 include traits such as personality and cognitive abilities and skills and competencies such as product expertise and foreign language fluency. The agent database 260 maintains agent performance indicators 420 and agent qualifications 430.

State Weighting Rules 440 include input from the contact center's management related to operational directives of the contact center 100. If management, for example, opts to emphasize quality over handling time for a given time period in the belief the new emphasis will better serve operational effectiveness, then a staff member can adjust weighting factors in the index computation 450 according to the new emphasis. If, for example, management redefines operational effectiveness from profit to number of customers served, then a staff member can adjust weighting factors that preferentially select agents 230 with low handling times.

In addition to being responsive in a reactive mode, the present invention functions in an anticipation or planning mode. For example, management can set-up several state-related situations and scenarios ahead of time, either in anticipation of a specific event or for contingency purposes. Some situations occur with regularity during a time period such as a year or a day. For example call volume associated with gift purchasing typically increases during the Christmas holiday season. The present invention can improve the center's operational effectiveness by automatically applying state weighting rules 440 during such times.

Figure 7:
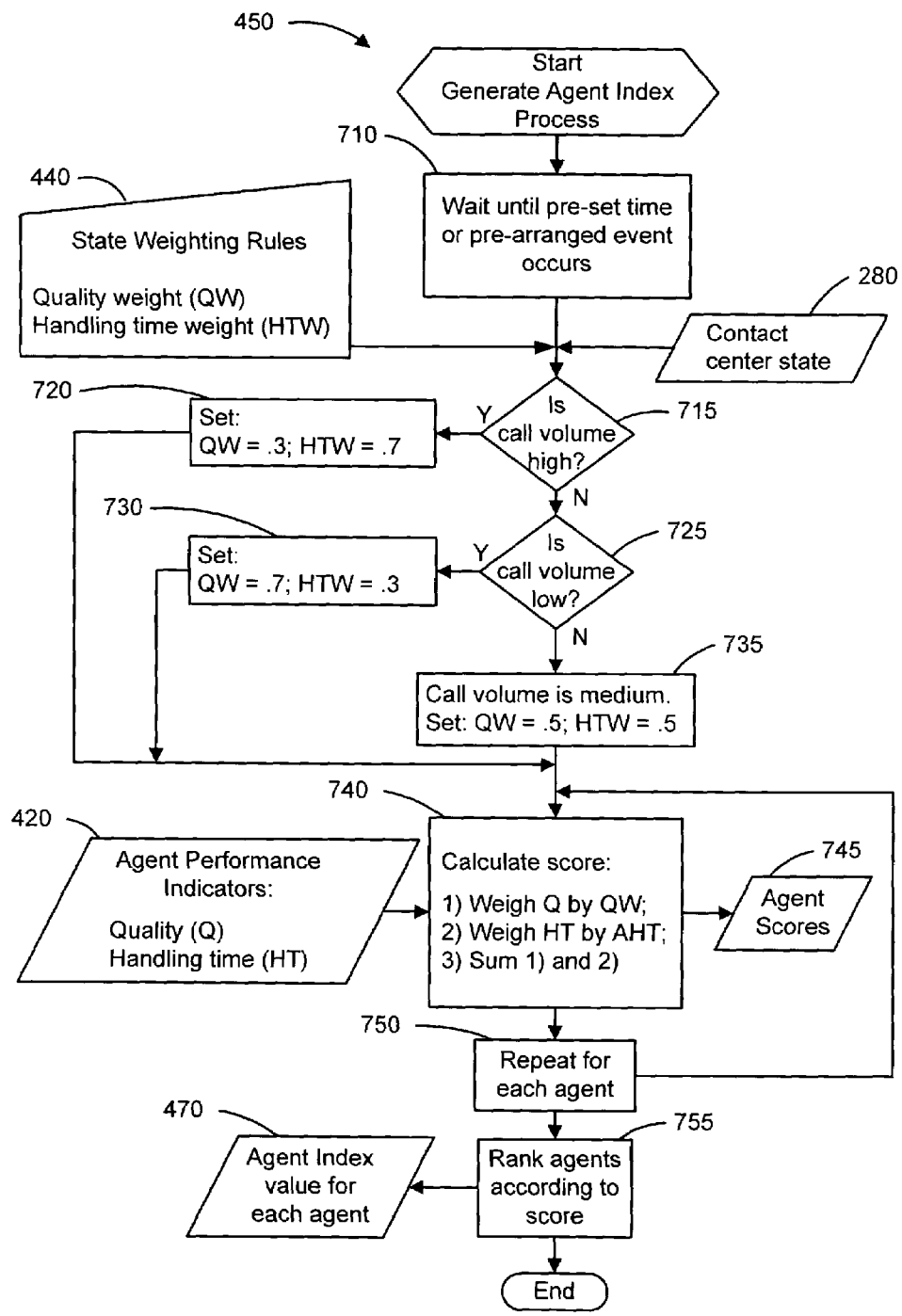
FIG. 7 is a flow chart illustrating steps in a process for generating a performance index for agents at a computer-based contact center system in accordance with an exemplary embodiment of the present invention.

The Generate Agent Index process 450 receives state weighting rules 440, performance indicators 420, and contact center state 280 and outputs agent index values 470. Contact center state 280 includes aggregate agent performance metrics, call volume, and contact center performance. FIG. 7 illustrates Generate Agent Index 450 in further detail.

Figure 9:
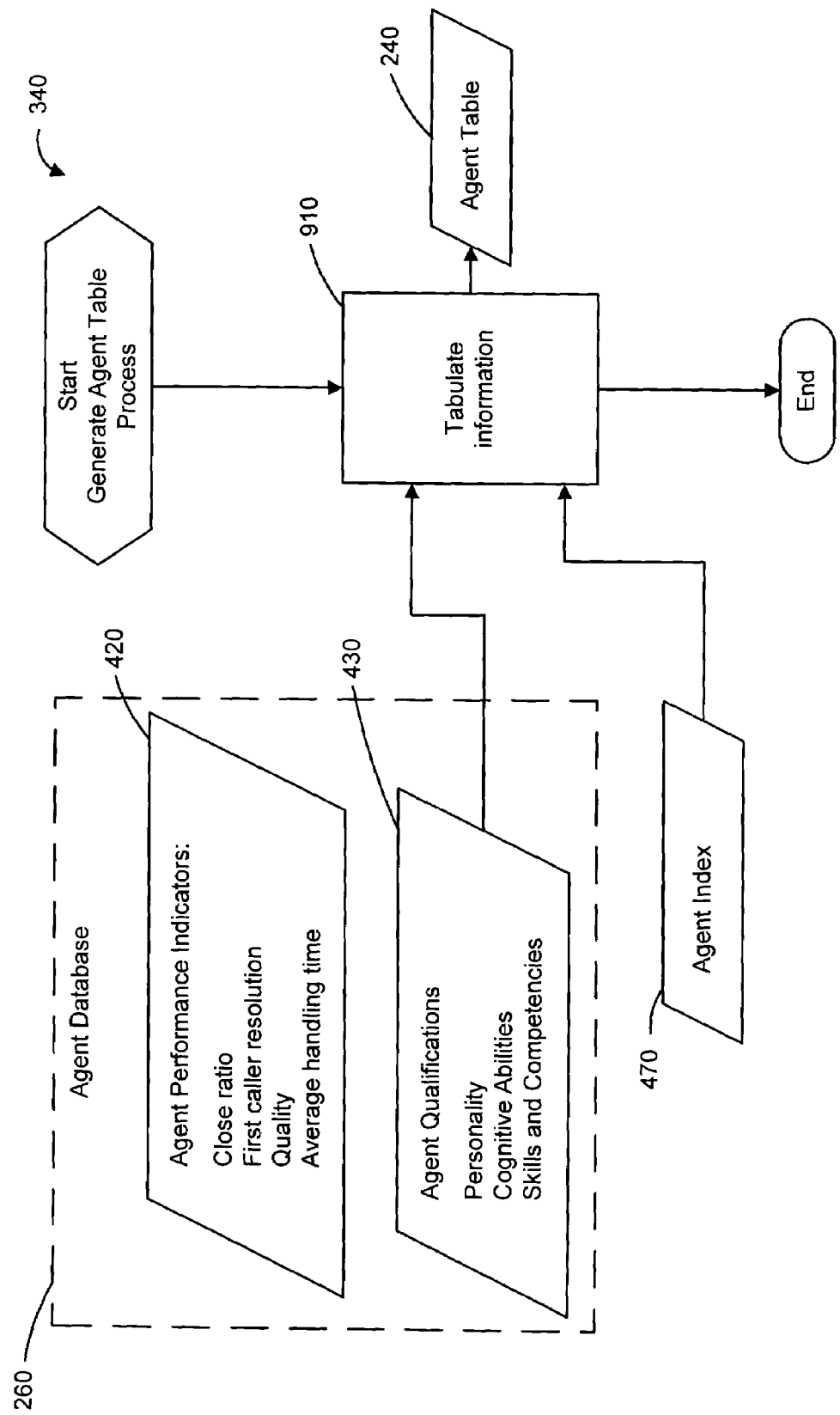
FIG. 9 is a flow chart illustrating steps in a process for generating an agent table that incorporates information pertinent to routing a call to a select agent in a computer-based contact center system in accordance with an exemplary embodiment of the present invention.

The Generate Agent Table process 340 receives the agent index values 470 and the agent qualifications 430, and then assembles this data into an agent table 240. FIG. 9 illustrates Generate Agent Table Process 340 in further detail. The Route Call process 350 processes the agent table 240 and routes the call to a selected agent 230.

FIG. 5 illustrates an exemplary process 310, titled Queue Incoming Calls, for queuing calls. In Step 510, the IVRS 115 receives incoming calls. In Step 520, the IVRS interacts with the caller 105 to determine information about the call such as the caller's preferred language and the purpose of the call. In Step 530, the ACD 130, via its RBDE 210, categorizes each caller according to the agent qualifications needed to take the call. In Step 540, the ACD 130 selects a queue to hold the call based on the category determined in Step 530. After selecting the appropriate queue, the ACD 130 places the call in the queue. Process 310 repeats for each incoming call.

FIG. 6 illustrates an exemplary process 410, titled Assess Each Agent, for determining up-to-date qualifications 430 and performance indicators 420 for each agent 230. In Step 605, the training system 120, in collaboration with the directives of the contact center management, administers a traits test. The traits test is preferably a computer-based series of questions that is usually administered only once for each agent 230. In Steps 610 and 615, a computer system deduces each agent's cognitive abilities and personality traits 625 from the responses to the questions. In Step 620, a computer system stores the cognitive abilities and personality traits data 625 in the agent qualifications section 430 of the agent database 260. Cognitive abilities and personality 625 are components of each agent's qualifications 430.

Steps 630–680 assess an agent's skills and competencies as these are the qualifications 430 that typically evolve with experience and training. Thus, Steps 630–680 are preferably repeated frequently, through a time-based cycle and an event trigger. The performance monitoring component 145 updates the performance indicators 420 as agent performance is assessed. The training system 120 tests agent skills both after administering training and at regular intervals.

In Step 630, the training system 120 trains an agent 230. In Step 635, the training system 120 administers a skills test to an agent 230. In Step 640, the training system 120 deduces the agent's skills and competencies 650 from the training test results. In Step 645, the training system 120 stores the skills and competencies 650 in the qualifications section 430 of the agent database 260. In Step 655, the agent 230 gains on-the-job experience. In Step 660, the performance monitoring component 145 monitors the agent's performance. In Step 665, the performance monitoring component 145 deduces updated skills and competencies 650 from the monitored performance. In Step 670, the performance monitoring component 145 appends or updates the agent database 260 with the newly acquired skills and competency data 650. In Step 675, the APRS 205 derives performance indicators 420 from the monitored performance. In Step 680, the APRS stores the performance indicators 420 in the agent database 260.

Whereas FIG. 6 illustrates an example of a contact center's processes related to assessing and training agents 230, a center's processes and components related to training agents 230 and monitoring performance can deviate from this example. In one embodiment of the present invention, the performance monitoring component 145 updates the agent database 260 with performance indicators 420. The performance indicators 420 are then cross examined to determine if an agent's on-the-job performance has improved over a period of time and if the agent's actual performance has sustained the improvement. After it is confirmed that the agent 230 has retained the improvement, the agent database 260 is updated, and/or appended, to indicate that the improvement in a skill or competency has been validated and retained. In one embodiment, the performance monitoring system 145 provides performance indicator results rather than specifically updating skills and competencies.

The center's training-related processes can proceed by: identifying performance gaps; administering training; completing the training; administering tests; validating retention of the training; monitoring performance; and updating a qualifications section 430 of an agent table 260 with the new skill or competency and proficiency when the monitored performance indicates that performance and behavior has changed.

In one embodiment of the present invention, the process proceeds according to the steps listed immediately below as Steps A–K.

A) The training system 120 identifies gaps in an agent's performance.
B) The training system 120 delivers computer-based training to the agent 230.
C) The agent 230 receives the training via a computer such as an agent terminal 155.
D) The agent 230 completes the computer-based training.
E) The training system 120 administers a computer-based test to the agent 230 on the subject matter of the training.
F) The training system 120 determines that the agent 230 passed test.
G) The agent 230 performs contact servicing duties.
H) The agent's on-the-job performance is monitored.
I) The training system 120 receives performance monitoring information indicating agent performance has improved.
J) The agent's qualifications in the agent database 260 are updated to indicate that the agent 230 has acquired new qualifications.
K) The call routing function is responsive to the new qualifications.

FIG. 7 illustrates an exemplary process 450, titled Generate Agent Index, for computing an agent index according to one embodiment of the present invention. In Step 710, Process 450 waits until a pre-set time or pre-arranged event occurs before proceeding. Stated another way, the Agent Index Manager 250 computes new agent index values 470 with batch processing that proceeds at regular time intervals or when warranted by an event. Events that typically warrant refreshing the index values 470 include staff changes, updated performance data 420, new operational objectives, new training, and revised agent qualifications. The index values 470 can be refreshed periodically such as daily, weekly, hourly, minute-by-minute, second-by-second, or monthly.

When Routine 450 executes, it acquires contact center state 280 and state weighting input 440. Contact center state 280 includes such information as real-time call volume data 280 captured by the ACD 130, historical call volume statistics stored on a hard drive 280, and future call volume 280 forecasted by management. It can also include other aggregate agent indicators such as the center's overall revenue per call. In the illustrated embodiment, state weighting rules 440 include a quality weight and a handling time weight, each of which is a function of call volume. In other embodiments, state weighting rules 440 incorporate other parameters and can incorporate multiple parameters in one computation. For example, weighting rules 440 can incorporate multiple state parameters of a contact center 100.

Inquiry Step 715 of exemplary Routine 450 determines if the call volume 445 is high. If the call volume 445 is high, Step 720 sets the quality weight to 0.3 and the handling time weight to 0.7. If the call volume 445 is not high, inquiry Step 725 determines if the call volume 445 is low. If the call volume 445 is low, Step 730 sets the quality weight equal to 0.7 and the handling time weight equal to 0.3. If the call volume 445 is not low, then it is medium, since it is exactly one of high, medium, and low. Step 735 sets the quality weight equal to 0.5 and the handling time weight equal to 0.5.

Step 740 calculates a performance score 745 for each agent 230. Step 740 computes the performance score 745 by: applying the quality weight to the quality performance indicator 420; applying the handling time weight to the handling time indicator 420; and combining the weighted quality indicator with the weighted handling time indicator.

In one embodiment, Step 740's computation adjusts the handling time indicator to place it on a similar scale to quality. Handling time is unique from other indicators of agent performance in that shorter handling times are generally preferred over longer handling times.

In one embodiment, Step 740's computation places indicators with disparate units onto a single scale. In one such embodiment, the computation places quality, which has units of percent; handling time, which has units of time; and revenue, which has units of dollars, onto a single scale.

In one embodiment, Step 740 computes an adjusted handling time indicator as follows. Range is the pre-determined maximum time that an agent 230 could spend on a call minus the predetermined minimum time that an agent 230 could spend on a call. The adjusted handling time equals the actual handling time minus the minimum handling time. The adjusted handling time indicator equals the range minus the adjusted handling time divided by the range. The handling time score equals the adjusted handling time indicator multiplied by the handling time weight.

HTRange=MaxHT−MinHT
AdjHT=HT−MinHT
AdjIndicHT=(HTRange−AdjHT)/HTRange
HTScore=AdjIndicHT*HTW Handling time is but one example of an indicator that can be applied for state weighting. The present invention can apply any one of the various states 280 described throughout this paper. Furthermore, the present invention can incorporate multiple states 280. For example a contact center may desire to maximize revenue or quality, even at the expense of another performance metric. The present invention supports computing index on the basis of multiple indicators with distinct prioritization for each indicator.

Step 750 iterates Step 740 for each agent 230. Step 755 ranks each agent 230 according to score and sets index value equal to rank. Step 755 outputs an index value 470 for each agent 230. Process 450 ends following Step 755.

FIG. 8 depicts a table 800 of performance profiles that illustrates exemplary index computations. The Performance Profiles table 800 includes two representative sections, an Agent-A section 805 and an Agent-B section 810. The first column 815 of the Agent-A section 805 lists several agent performance indicators. The second column 820 lists a target for each performance indicator. The third column 830 lists the agent's actual value of each performance indicator. The fourth column 840 lists the computational weight of each performance indicator. In this example, Quality is assigned a weight of 0.3 and average handling time is assigned a weight of 0.7. The remaining performance indicators are assigned a weight of zero and consequently have no contribution to the score totals, as listed in the fifth column 850. The total score 860 is the addition of the scores of each of the performance indicators. The sixth column 870 presents the rank, or index, of the agent.

FIG. 9 is a flow chart illustrating an exemplary process 340, titled Generate Agent Table, for outputting an agent table 240. Step 910 compiles data from the agent database 260 with the agent index values 470. In one embodiment, agent qualification data 430 is included in the agent table 240 and the agent performance indicators 420 are excluded.

In one embodiment, the ACD 130 has a standard format and Step 910 formats the agent table 240 according to that standard format. In one embodiment, the ACD's programming and/or rules are adjusted to conform to the standard format of the Generate Agent Table process 340.

The ACD can acquire the agent table from the APRS 205 in either a push communication process or a pull communication process. In one embodiment, the APRS 205 transmits the table by pushing it to the ACD 130. In another embodiment, the ACD 130 pulls the table from the APRS 205. In another embodiment, the ACD 130 stores, and regularly updates, the table on a computer-readable medium and the APRS 205 accesses it freely.

FIG. 10 illustrates an exemplary agent table 240 generated in accordance with the Generate Agent Table process 340. The table 240 lists tabulated data for five agents 1010. Performance data 1015 and qualifications data 1020 make up the table's two categories of data. Performance data 1015 includes scores 1023 and index values 1026 for each agent 230. Qualifications data 1020 includes traits 1030 and skills 1035. Traits data 1030 includes cognitive abilities 1040 and personality 1043. Skills and competency data 1035 includes languages 1050, products 1055, listening 1060, and problem solving 1065. The table 240 divides language skills 1050 into Spanish fluency 1070 and English fluency 1075 and products skills 1055 into flowers skills 1080 and candy skills 1085. For each skill category, the table 240 provides a proficiency rating where P0 is the lowest rating and P5 is the highest rating. In one embodiment of the present invention, the level of skill or competency defines the proficiency. In one embodiment of the present invention, the skills and competencies represented in an agent table 240 are significantly more comprehensive and/or expansive than the illustrative table 240 depicted in FIG. 10. For example, the agent table 240 can be a database with numerous skills and competencies listed for each agent 230.

In summary, the present invention supports selecting a preferred agent 230 to service a contact at a contact center 100, wherein the preferred agent's performance history predicts that he/she will realize greater value, or contribution to the center's operational effectiveness or efficiencies, from the contact than will other agents 230. The present invention supports factoring agent qualifications into the prediction. The present invention also supports assigning an index value 470 to each agent 230, wherein the index 470 ranks each agent 230 according to his/her predicted contribution to the operational effectiveness of the center 100, if he/she serviced the call. The present invention also provides an agent selection process based on real-time information from the center's computer systems and information infrastructure 165. When two or more agent performance metrics 420 are available and pertinent, the process considers both and weighs each in terms of relevance to operational effectiveness. The process adapts the computation, for example by adjusting the relative weights of two or more performance metrics 420, to compensate for dynamics in the contact center's operating conditions. For a single performance metric, the process can weigh the single metric on the basis of the state 280 of the contact center 100. For multiple performance metrics, the process can weigh each distinctly on the basis of the state 280 of the contact center 100.

From the foregoing, it will be appreciated that the preferred embodiment of the present invention overcomes the limitations of the prior art. From the description of the preferred embodiment, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. A method to manage operational effectiveness in a contact center comprising:
   receiving a first indicator value representing performance that an agent of the contact center achieved while processing contacts;
   receiving a second indicator value representing a result of testing the agent while the agent was detached from processing contacts;
   generating an index that is a function of the first indicator value and the second indicator value; and
   adjusting an operation of the contact center on the basis of the index.

2. The method of claim 1, wherein the adjusting step comprises selecting a resource to deploy in the contact center on the basis of the index.

3. The method of claim 1, wherein the adjusting step comprises selecting the agent to service a contact on the basis of the index.

4. The method of claim 1, wherein the generating step comprises generating the index as a function of contact center state, the first indicator value, and the second indicator value.

5. The method of claim 1, wherein the index ranks each agent in a plurality of agents.

6. The method of claim 4, wherein:
   the contact center state comprises a characterization of the center's rate of servicing contacts;
   the first indicator represents time-based performance of the agent; and
   the function is operative to weigh the first indicator more heavily when the contact center state is above a threshold than when the contact center state is below the threshold.

7. The method of claim 4, wherein the contact center state comprises a forecast based on historical data.

8. A computer-readable medium having computer-executable instructions for performing the steps recited in claim 1.

9. A method to select an agent from a plurality of agents of a contact center to service a contact, comprising the steps of:
   producing a performance measurement for each agent in the plurality of agents in response to monitoring contact service episodes;
   producing a performance predictor for each agent in the plurality of agents in response to administering a test that evaluates at least one of an innate ability and a personality trait;
   generating a performance indicator for each agent in the plurality of agents based on a weighted combination of the performance measurement and the performance predictor;
   ranking each agent in the plurality of agents on the basis of the performance indicator; and
   selecting a preferred agent to service the contact on the basis of the preferred agent's rank.

10. The method of claim 9, further comprising the step of determining a state of the contact center,
    wherein the selecting step comprises selecting the preferred agent to service the contact according to the preferred agent's rank and the state of the contact center.

11. A method to select an agent from a plurality of agents of a contact center to service a contact, comprising:
    generating a plurality of performance indicators for each agent in the plurality of agents;
    computing an index for each agent in the plurality of agents using the generated plurality of performance indicators as computational inputs; and
    selecting a preferred agent to service the contact on the basis of the computed indices.

12. The method of claim 11, wherein generating the plurality of performance indicators comprises:
    generating a first performance indicator in response to administering an agent test via computer; and
    generating a second performance indicator based on a result achieved during an agent encounter with a contact.

13. The method of claim 11, wherein the computed indices predict each agent's relative contribution to the center's operational effectiveness.

* * * * *